July 11, 1961

J. J. SCHMIDT ET AL 2,992,342

RECIPROCATING TYPE ELECTRIC GENERATOR

Filed April 29, 1957

INVENTORS
JOSEPH J. SCHMIDT
ROBERT O. BARDWELL
BY
ATTORNEY

United States Patent Office 2,992,342
Patented July 11, 1961

2,992,342
RECIPROCATING TYPE ELECTRIC GENERATOR
Joseph J. Schmidt and Robert O. Bardwell, Denver, Colo., assignors to The Denver and Rio Grande Western Railroad Company, a corporation of Delaware
Filed Apr. 29, 1957, Ser. No. 655,778
1 Claim. (Cl. 310—15)

This invention relates to an improved mechanism for converting the mechanical energy of a reciprocating piston within a sealed cylinder into electrical energy in a stator core and circuit external of the cylinder.

It is an object of our invention to decrease the mass of the piston by an efficient utilization of the magnetically permeable constituent of the piston thru a novel arrangement of the poles in the external stator.

A further object is to reduce the weight of the entire electrical portion of the machine and to increase its efficiency thru the reduction of flux leakage.

A further object of our invention is to provide an arrangement that is adapted for generating alternating current of such selected frequency as may be desirable for a given installation.

Other objects and advantages will be more apparent to those skilled in the art from the accompanying drawing and the following description.

The engine disclosed herein, for purposes of illustration, may be any of the types disclosed in U.S. patent applications filed in the name of Frederick J. Geittman, Serial No. 639,441, filed February 11, 1957, entitled "Piston and Cylinder Nuclear Engine of the Closed System Type"; or Alfred N. Rogers, Serial No. 639,440, filed February 11, 1957, now abandoned, entitled "Nuclear Powered Engine of the Reciprocating Piston and Cylinder Type With Positive Scavenging"; or of Robert O. Bardwell, Serial No. 655,780, filed herewith, entitled "Piston and Cylinder Type Nuclear Engine With Shaped Reactivity."

Figure 1:
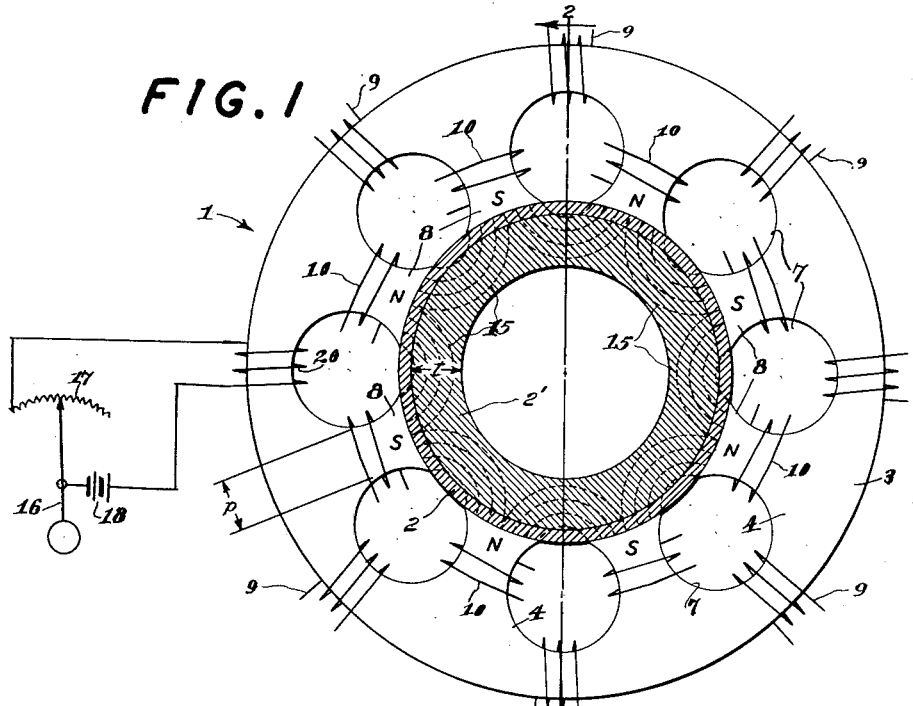
Figure 2:
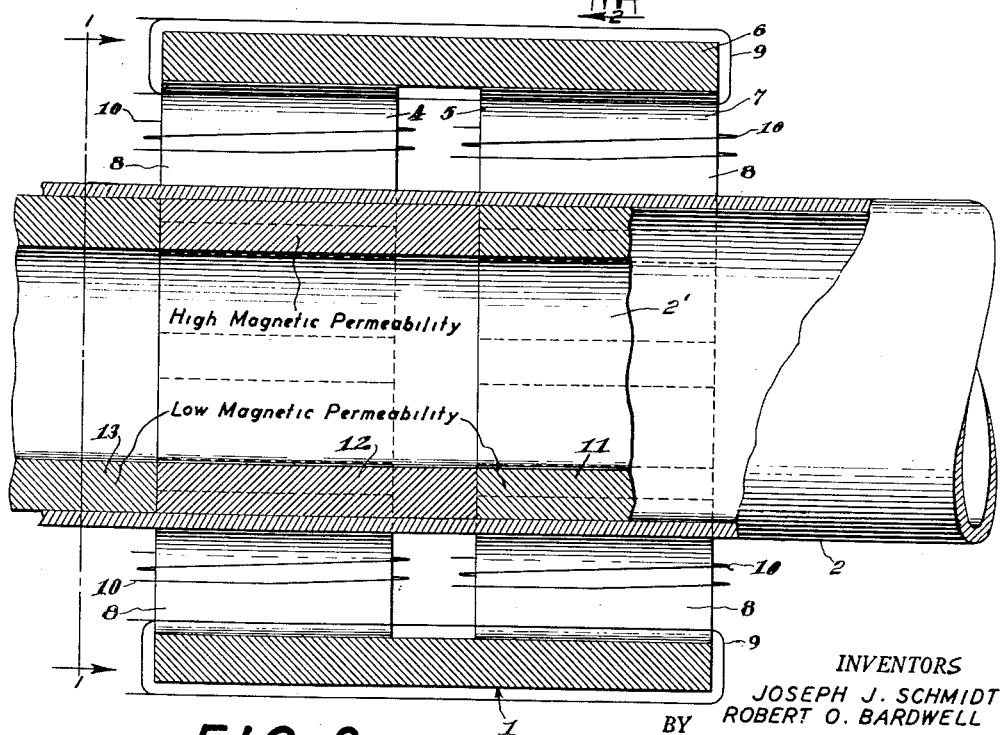

FIG. 1 diagrammatically illustrates a transverse section of our invention taken on the line 1—1 of FIG. 2, and FIG. 2 is a longitudinal section of a portion of the device taken on line 2—2 of FIG. 1.

In FIGS. 1 and 2 an electro-magnetic system 1 completely surrounds a cylinder 2 in which a hollow piston and inductor 2' reciprocates, the solid piston head not being shown for simplicity. The electro-magnetic system comprises a stator core 3 having, preferably, two axially spaced pole rings 4 and 5 commonly connected by a peripheral stator yoke 6. The pole rings are provided with circumferentially spaced axial openings 7 to form poles 8. Field coils 9 energize the core so that the poles will be alternately north and south as shown in FIG. 1. Surrounding each pole is an armature coil 10 in which a voltage is induced as a result of the reciprocating motion of the piston and an inductor forming a part thereof. The inductor portion of the piston is composed of alternate segments 11, 12 and 13 of material of high magnetic permeability and low magnetic permeability as indicated by the legends in FIG. 2. In the position shown, lines of flux passing between the adjacent poles are indicated as 15. A condition is shown in which the flux path is completed thru material of high permeability in the inductor for one ring of poles 4 in FIG. 2, the other ring of poles 5 being aligned with material of low permeability in the inductor. As the inductor moves toward the right, the flux path is completed in the ring of poles 5, while the flux path thru poles 4 is being broken. As shown in the section of FIG. 2, the field coils 9 simultaneously energize the magnets of both rings. The thickness $t$, FIG. 1, of the annular portion of the inductor 2' will closely approximate one-half of the effective pole width $p$, FIG. 1, thus effectively utilizing the iron in the piston for the conduction of the flux between adjacent poles of the external magnet. It is apparent that the basic structure shown in the drawings can be repeated along the length of the piston.

In one particular configuration, there are 16 poles per ring, each pole 4.8" long in the direction of piston motion, and 5.2" face around the circumference. Between the rings of magnets, a spacer of non-magnetic material 4.8" thick is provided. This pattern is repeated eight times along the axis of the machine. The annular magnetic portion of the piston is 3.95" thick and 4.8" long. This is followed in the piston by a length of material of low permeability 4.8" long, and this arrangement is repeated eight times along the length of the piston.

The magnetically permeable portion of the piston described here by way of illustration is constructed of soft iron, and the entire piston weighs 4,560 pounds. The field coil of the surrounding external stator core consists of a total of 4,100 turns distributed uniformly in the 16 gaps. The armature coils in the external core consist of 100 turns per pole. In this configuration, at an electrical frequency of 160 cycles per second the estimated output is 5,000 kw. of electrical energy.

Another advantage of our invention is that with the piston moving in a horizontal direction, it is possible to have a higher excitation current in the field windings in the upper quadrant than in the lower quadrant thereby tending to lift the weight of the inductor and consequently reduce friction and wear of the piston and cylinder during relative movement between the same. Also, it is possible to balance out lateral forces acting on the piston and inductor, such as might be caused by the nuclear engine being installed in a locomotive which, when traveling around a curve, would produce acceleration forces acting in an outward direction on the piston-inductor. To accomplish this I provide force sensitive means, in the form of an accelerometer control, for one or more of the laterally located field windings. For purposes of illustration I show a pivoted accelerometer bob 16 for variably controlling a resistance 17 which is connected in series with a field winding 20 and with a source 18 for the excitation current of that winding. The field excitation will be increased or decreased in accordance with the direction of lateral acceleration thereby balancing out the lateral acceleration forces by controlling the lateral pull exerted on the inductor by the field winding. The winding 20 can be of greater electro-magnetic capacity when fully energized than the other field windings or can be of lesser capacity if the resistance 17 is so adjusted. Thus it is possible to decrease the magnetic pull below that of the diametrically opposite winding, so that the latter winding will have sufficient lateral pull to neutralize a lateral force toward the left, FIG. 1, or vice versa, the winding 20 can be energized to have the greatest pull in a left hand direction to neutralize a lateral pull toward the right.

It will, of course, be understood that various changes in details of construction and arrangement of parts may be made by those skilled in the art without departing from the spirit of the invention as set forth in the appended claim.

We claim:

Apparatus for converting mechanical energy into electrical energy comprising, in combination, a sealed cylinder, a reciprocating piston therein having an inductor portion consisting of three successive segments of material, the intermediate segment having different magnetic permeability from the other two, a stator core disposed externally of the cylinder, said core having a pole ring with circumferentially spaced pole pieces disposed adjacent to the cylinder in the area in which the inductor reciprocates, said pole pieces being connected together at their outer portions by a peripheral stator yoke, armature windings around the pole pieces, field windings extending in axial direction around portions of the stator yoke so that the successive pole pieces are of alternate north and south polarity thereby causing lines of magnetic flux to extend from a north pole thru the inductor to the adjacent south poles whereby during travel of the inductor the lines of flux are increased to a maximum when the high permeability material is under the pole faces and is decreased to a minimum when the low permeability material is under such pole faces thereby inducing an alternating currrent in the armature windings, a lateral force-sensitive device, and means operated thereby for controlling the current in certain of the field coils so as to tend to counteract lateral forces imposed upon the piston.

References Cited in the file of this patent

UNITED STATES PATENTS

| | | |
|---|---|---|
| 1,662,433 | Murray | Mar. 13, 1928 |

FOREIGN PATENTS

| | | |
|---|---|---|
| 685,679 | Germany | Dec. 22, 1939 |
| 775,134 | France | Oct. 1, 1934 |
| 1,020,676 | France | Nov. 19, 1952 |